United States Patent

Bremer et al.

[11] Patent Number: 4,525,846
[45] Date of Patent: Jun. 25, 1985

[54] MODEM IN-BAND SECONDARY CHANNEL VIA RADIAL MODULATION

[75] Inventors: Gordon Bremer, Clearwater; William L. Betts, Madeira Beach; Robert T. Greene, St. Petersburg, all of Fla.

[73] Assignee: Paradyne Corporation, Largo, Fla.

[21] Appl. No.: 453,165

[22] Filed: Dec. 27, 1982

[51] Int. Cl.³ .............................................. H04L 27/08
[52] U.S. Cl. .......................................... 375/39; 370/20
[58] Field of Search ................. 375/38, 39, 40, 96; 370/20; 455/52, 132

[56] References Cited

U.S. PATENT DOCUMENTS

| | | | |
|---|---|---|---|
| 3,710,257 | 1/1973 | Low et al. ............................ | 370/20 |
| 3,732,375 | 5/1973 | Kuribayashi ........................ | 375/39 |
| 3,809,817 | 5/1974 | Gill et al. ............................ | 370/20 |
| 3,855,533 | 12/1974 | Schueli ............................... | 375/39 |
| 4,255,713 | 3/1981 | Yoshida .............................. | 375/39 |
| 4,347,616 | 8/1982 | Murakami .......................... | 370/20 |
| 4,389,722 | 6/1983 | Hofmeister ......................... | 375/39 |

*Primary Examiner*—Robert L. Griffin
*Assistant Examiner*—Stephen Chin
*Attorney, Agent, or Firm*—Kane, Dalsimer, Kane, Sullivan & Kurucz

[57] ABSTRACT

A transmission system for transmitting a first data series, and a second data series from a first modem to a second modem using QAM or PSK type modulation techniques. The first data series is sent using standard QAM techniques such as an 8-point scheme, wherein each point has a radial component. The second data series is sent by modulating slightly the radial components of the transmitted symbols between two values in accordance with the second data series.

2 Claims, 4 Drawing Figures

MODEM IN-BAND SECONDARY CHANNEL VIA RADIAL MODULATION

FIELD OF THE INVENTION

This invention relates to high speed digital communication equipment and more particularly to equipment using QAM or PSK modulation techniques.

BACKGROUND OF THE INVENTION

This invention involves a modem which receives a series of bits from a data source for transmission. The data bits are then arranged into groups of bits each group defining a transmitted point or symbol. The size of each group depends on the type of modulation used. For example, if the data rate is 4800 b/s and 8-point QAM is used then each group is formed of three bits. Next, each group of bits is translated into one of the QAM points and then transmitted. At the receiver end the process described herein is reversed.

Thus, for example, if the modem is capable of transmitting 1,600 symbols/sec., its transmission rate is 4,800 bits/sec. Such modems are well known in the art.

The inventors have found that the capability of such modem can be further increased in the manner described below.

SUMMARY OF THE INVENTION

The objective of this invention therefore is to provide a modem with an increased capability by having a first or primary channel operating at a normal bit rate and a secondary channel operating at a lower bit rate.

This objective is achieved according to this invention by providing a transmitter which selectively changes the radial component of certain transmitted QAM-PSK symbols in a predetermined pattern and a receiver which is adapted to recognize such changes in the radial amplitudes of the received symbols. These changes are dictated by the bits presented to the transmitter from the secondary input. The receiver correlates the radial amplitude of a plurality of received symbols to detect the secondary channel date. This correlating function reduces radial amplitude errors that may be introduced by noise. The present invention has utility independently or with the system described in copending application entitled MODEM MULTIPLEXER SYNCHRONIZATION BY RADIAL MODULATION Ser. No. 447,988, 12-8-82 filed on the same date as the present application, the description of which is incorporated herein by reference.

DESCRIPTION OF THE PREFERRED EMBODIMENT

Figure 1:
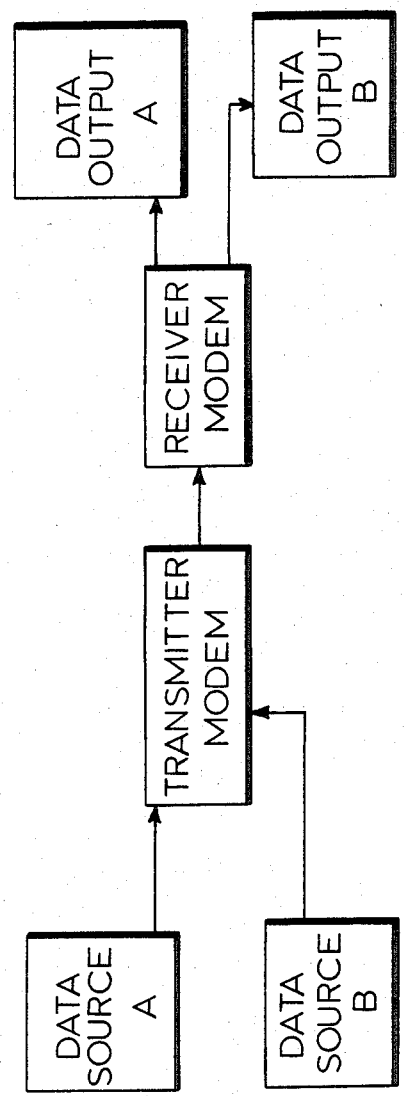
FIG. 1 shows a general scheme for interconnecting two modems in which the present invention is incorporated.

As can be seen in FIG. 1, the data from two data sources 10 and 20 are fed to a transmitter modem 30. The transmitter modem 30 is connected via a standard transmission channel 40 to a receiver modem 50. The receiver modem 50 demodulates and separates the signals and then sends them to data outputs 60 and 70.

Data source A, indicated by numeral 10 is the primary data source and provides for example, data at a rate of 4,800 b/s. The bits A1, A2 . . . are arranged by the modem into groups of three bits which are converted into a corresponding 8-point QAM symbol and transmitted as a series of symbols X1, X2, X3 . . . These points 1-8 are shown on the eye diagram in FIG. 3.

Figure 3:
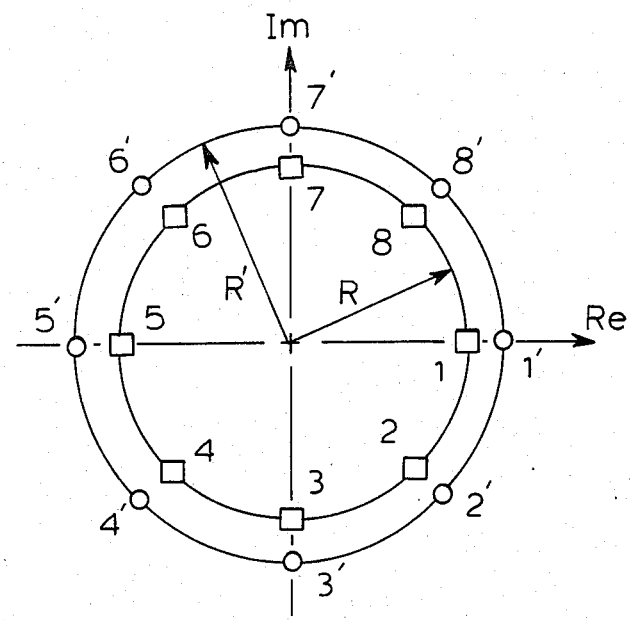
FIG. 3 shows a typical 8-point QAM eye diagram modified in accordance with the invention.

The eye-diagram is a graphical representation of the complex values of the points, with the horizontal axis being the real or in-phase axis of the modulated carrier FO and the vertical axis being the imaginary or quadrature axis of the modulated carrier FO. Thus, the points 1-8 all have the same radial component R but different phase components. In this invention, the radial component is selectively changed between R and R' where R' is larger or smaller than R. In FIG. 3, R' is shown as being larger than R and represented by the points 1'-8'.

Figure 2:
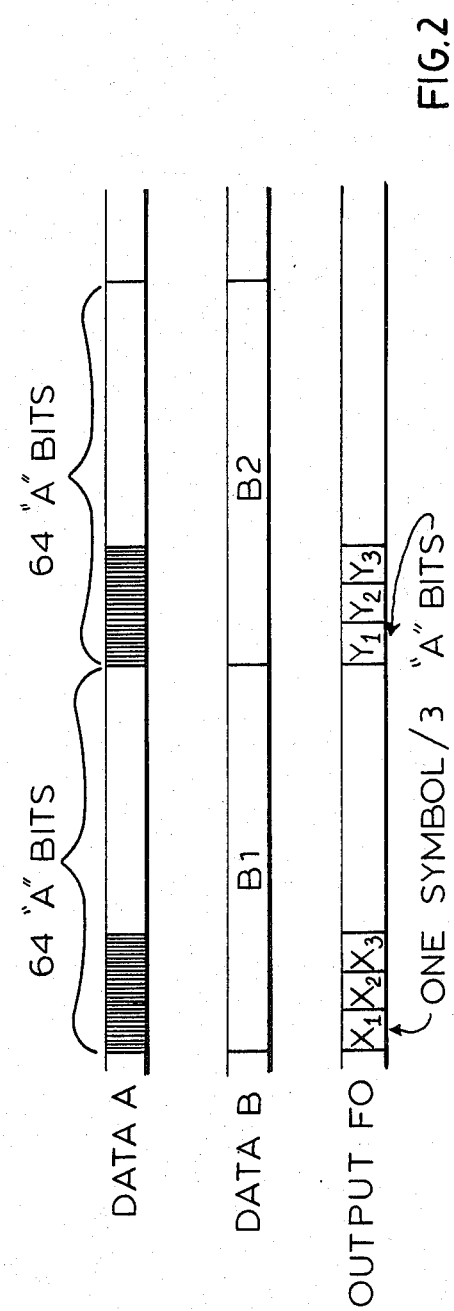
FIG. 2 is a graphic comparison of input and output signals within the transmitter.

Data source B, indicated by numeral 20 is the secondary data source which provides, as an example, data at a data rate which is one sixty-fourth that provided by data source A, or 75 bits/sec. The digital value of each bit B is used to control changes of the radial component. This is illustrated in FIG. 2 where the first bit received from secondary data source B is indicated as B1 resulting in the transmission of symbols X1, X2, X3 . . . The second bit received from secondary data source B is indicated as B2 resulting in the transmission of symbols Y1, Y2, Y3 . . . If data B is a binary "0" for example, each of the transmitted symbols (X1, X2, X3 . . . or Y1, Y2, Y3 . . .) has a radial component R. However, if B is a binary "1" the symbols are alternated between radial components R and R' in either the sequence R', R, R', R, R', R . . . , or R, R', R, R', R, R' . . . depending upon the symbol present at the reception of B.

Figure 4:
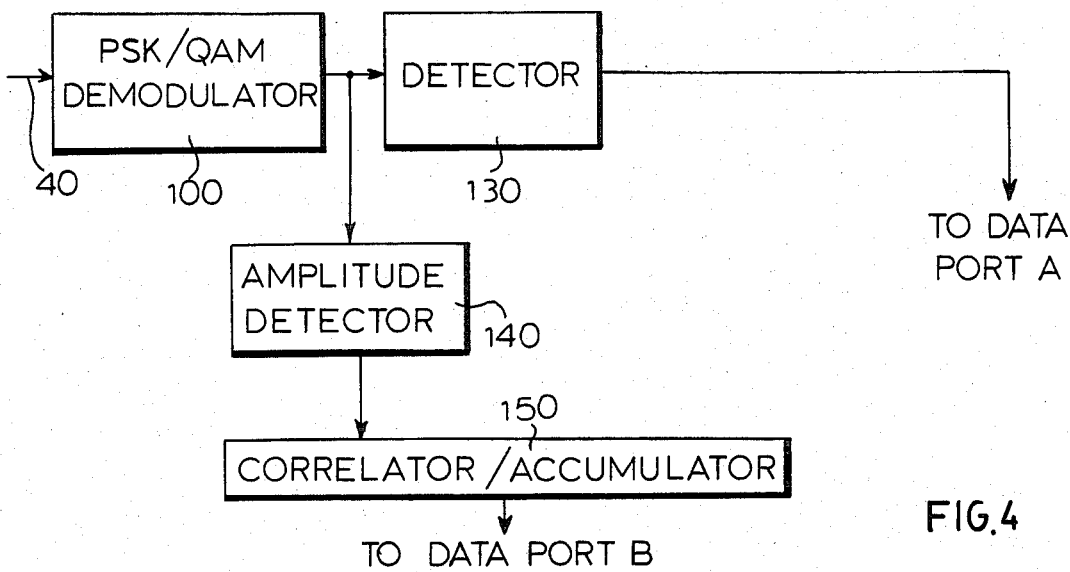
FIG. 4 shows a block diagram of the receiver.

The components of the receiver are shown in block-diagram form in FIG. 4. The received symbols are detected by PSK/QAM demodulator 100. The detector 130 generates groups of three bits which are fed serially to data output A at 4,800 b/s. Each group corresponds to an 8-point QAM/PSK symbol illustrated in FIG. 3. Thus the demodulation of the primary channel, i.e. of the bit series which originated from data source A is complete.

The received symbols are also fed to a radial amplitude detector 140 which detects the value of the radial component of each symbol and feeds said value to correlator/accumulator 150. The correlator/accumulator 150 continuously correlates the amplitudes of the last N received symbols. The value so obtained is then compared to a threshold value in order to determine the data appear at data output B.

Thus, for example if the receiver receives a string of symbols of the form ZZZZWWWW where the radial component of all of the Z symbols is constant and the radial component of the W symbols alternates between R and R' the correlator/accumulator correlates the radial amplitude of the last N signals and if this value is less than the threshold value, the correlator determines that the received signals have been sent out as X's and sends a bit to data port B which corresponds to binary "0". If, however, the value is above the threshold, the received signals were sent out as Y's, and the correlator sends a binary "1" to data port B.

While the invention was described with reference to an 8-point QAM-PSK type modulation, it is clear that it would be equally effective in any other type of QAM/PSK type modulation.

It is clear that other variations of the invention are possible without violating the scope of the invention as set forth in the appended claims.

We claim:

1. A method of transmitting a first and second input series of input bits simultaneously, over a single data channel comprising:

generating a series of symbols having a radial amplitude and corresponding to said first series of input bits;

maintaining the radial amplitude of said symbols at a first level if said second input bits have a first value and alternating said radial amplitude between said first value and a second value for consecutive symbols when said second input bits have a second value;

sending said symbols over said communication channel, to a receiver;

detecting the radial amplitudes of the signals received by said receiver;

correlating the radial amplitudes of a last preselected number of received signals to obtain a correlated value;

comparing said correlated value to a threshold value; and generating a series of output bits having a first value if said correlated value is above said threshold value; and a second value if said correlated value is below said threshold value.

2. The method of claim 1 wherein said first and second series of input bits have corresponding first and second data rates, said first data rate exceeding said second data rate.

* * * * *